United States Patent
Powell et al.

(10) Patent No.: US 11,029,534 B2
(45) Date of Patent: Jun. 8, 2021

(54) MULTIPLE-WAVELENGTH LENS FORMING SYSTEM AND METHOD

(71) Applicant: Johnson & Johnson Vision Care, Inc., Jacksonville, FL (US)

(72) Inventors: Paul Mark Powell, Jacksonville, FL (US); Peter W Sites, Jacksonville, FL (US); Joe M Wood, Jacksonville, FL (US); Michael F Widman, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 110 days.

(21) Appl. No.: 16/154,632

(22) Filed: Oct. 8, 2018

(65) Prior Publication Data
US 2020/0110282 A1   Apr. 9, 2020

(51) Int. Cl.
*B29C 35/08* (2006.01)
*B29D 11/00* (2006.01)
*G02C 7/04* (2006.01)
*B29C 39/26* (2006.01)

(52) U.S. Cl.
CPC ............ *G02C 7/04* (2013.01); *B29C 35/0805* (2013.01); *B29C 39/26* (2013.01); *B29D 11/00134* (2013.01); *B29D 11/00153* (2013.01); *B29C 2035/0833* (2013.01)

(58) Field of Classification Search
CPC ........ B29D 11/00153; B29D 11/00134; B29C 35/0805; B29C 2035/0833; G02C 7/04
See application file for complete search history.

(56) References Cited

U.S. PATENT DOCUMENTS

| | | | |
|---|---|---|---|
| 4,165,265 A | 8/1979 | Nakabayashi et al. | |
| 4,411,931 A | 10/1983 | Duong | |
| 4,495,313 A | 1/1985 | Larsen | |
| 8,317,505 B2 | 11/2012 | Widman et al. | |
| 8,318,055 B2 | 11/2012 | Widman et al. | |
| 9,266,294 B2* | 2/2016 | Widman | G02C 7/04 |
| 10,401,647 B2* | 9/2019 | Wildsmith | B29D 11/00038 |
| 10,571,718 B2* | 2/2020 | Widman | B29D 11/00134 |
| 2018/0250899 A1 | 9/2018 | Chien | |
| 2020/0150456 A1* | 5/2020 | Widman | B29D 11/0073 |

FOREIGN PATENT DOCUMENTS

JP    07261184 A   * 10/1995

OTHER PUBLICATIONS

Translation of JP-07261184-A (Year: 1995).*

* cited by examiner

*Primary Examiner* — Marc C Howell
*Assistant Examiner* — John J Derusso

(57) ABSTRACT

An apparatus and method for forming a contact lens includes submerging a convex optical quality surface of a forming optic in a reservoir containing Lens Reactive Mixture, projecting a first Actinic Radiation with a first wavelength through pre-selected regions of the forming optic that correspond to increased thickness in the lens to be formed for selectively polymerize the Lens Reactive Mixture on a Voxel by Voxel basis; projecting a second Actinic Radiation with a different wavelength through the entire forming optic to selectively polymerize the Lens Reactive Mixture on a Voxel by Voxel basis, removing the forming optic and polymerized Lens Reactive Mixture from the reservoir and applying a Fixing Radiation to form the contact lens.

6 Claims, 8 Drawing Sheets

FIG. 1 *PRIOR ART*

| BuildDefID | LensProfileID | RegionID | SublayerID | RegionPriority | SublayerPriority |
|---|---|---|---|---|---|
| 12 | Single_Seq_FullBitSplit | 2 | 11 | 1 | 1 |
| 16 | Single_Seq_FullBitSplit_NSC | 2 | 11 | 1 | 1 |
| 17 | Mukuls_Growth_Factor_:) | 2 | 17 | 1 | 1 |
| 18 | MultispectralLensProfile | 4 | 19 | 2 | 1 |
| 20 | MultispectralLensProfile | 3 | 18 | 1 | 1 |
| 21 | MultispectralLensProfile 2 | 2 | 18 | 1 | 1 |
| 23 | MultispectralLensProfile 2 | 2 | 19 | 2 | 2 |
| 24 | MultispectralLensProfile | 3 | 19 | 2 | 2 |
| 24 | MultispectralLensProfile Test 3 | 7 | 24 | 2 | 1 |
| 25 | MultispectralLensProfile Test 3 | 6 | 21 | 1 | 1 |
| 26 | MultispectralLensProfile Test 3 | 6 | 24 | 1 | 2 |
| NULL | NULL | NULL | NULL | NULL | NULL |

FIG. 4a

| RegionID | Description | IsDefault | IsGeometry | OrderRadius | CircleCenterX | CircleCenterY | ThresholdAndOr | Threshold1GTorLT | Threshold1Value | Threshold2GTorLT | Threshold2Value | Inclusive |
|---|---|---|---|---|---|---|---|---|---|---|---|---|
| 1 | NULL | True | NULL | NULL | NULL | NULL | NULL | NULL | NULL | NULL | NULL | True |
| 3 | Thick lens region-long wavelength... | False | False | NULL | NULL | NULL | NULL | 1 | 0.375 | NULL | NULL | True |
| 4 | Entire lens-multispectral | True | False | NULL | NULL | NULL | NULL | 2 | 2 | NULL | NULL | True |
| 6 | Thick lens region-long wavelength... | False | False | NULL | NULL | NULL | NULL | 1 | 0.46 | NULL | NULL | True |
| 7 | Entire lens-multispectral Test 3 | True | NULL | NULL | NULL | NULL | NULL | 2 | 2 | NULL | NULL | True |
| NULL | NULL | NULL | NULL | NULL | NULL | NULL | NULL | NULL | NULL | NULL | NULL | NULL |

*FIG. 4b*

| SublayerID | Description | IsDefault | ProjectionParamsID | FixedThickness | PercentThickness |
|---|---|---|---|---|---|
|  | NULL | True | BS32768 | NULL | NULL |
| 17 | NULL | False | MrKul | NULL | NULL |
| 18 | Thicker sublayer-long wavelength build | False | Multispectral-LongLED | 0.2 | NULL |
| 19 | Entire Lens-default short wavelength build | True | Multispectral-ShortLED | NULL | NULL |
| 20 | Entire Lens-default short wavelength build Test | False | Multispectral-ShortLED | NULL | 100 |
| 21 | Thicker sublayer-long wavelength build Test 3 | False | Multispectral-LongLED Test 3 | 0.01 | NULL |
| 24 | Entire Lens-default short wavelength Test 3 | True | Multispectral-ShortLED Test 3 | NULL | NULL |
| * | NULL | NULL | NULL | NULL | NULL |

*FIG. 4c*

| ProjectionParamsID | ShortWavelen... | LongWavelengt... | BitSplit | GrowthFactor | MaxExposure |
|---|---|---|---|---|---|
| RSVP3 | 3.1 | 0 | 32768 | 32.84 | 110 |
| LongWavelength | 0 | 2 | 24576 | 3 | 110 |
| MrKul | 3.1 | 0 | 16384 | 280 | 110 |
| Multispectral-LongLED | 0 | 3.8 | 16384 | 71 | 110 |
| Multispectral-LongLED Test 3 | 0 | 3.8 | 8192 | 490 | 110 |
| Multispectral-ShortLED | 3.11 | 0 | 16384 | 12 | 110 |
| Multispectral-ShortLED Test 3 | 3.11 | 0 | 16384 | 31.27 | 110 |
| NULL | NULL | NULL | NULL | NULL | NULL |

*FIG. 4d*

MULTIPLE-WAVELENGTH LENS FORMING SYSTEM AND METHOD

FIELD OF USE

The present invention relates generally to field of contact lenses, and more specifically to new and improved methods for efficiently forming custom contact lenses.

BACKGROUND OF THE INVENTION

The use of contact lenses to correct vision is common place in today's world. There are presently several traditional methods of high-volume, low-cost contact lens manufacture. These methods include, but are not limited, to cast molding, spin casting, lathing, using a technique known in the industry as "Lightstream Technology", and any combinations thereof.

More recently, a new system and method for manufacturing contact lenses has been disclosed in which an infinite number of truly custom lenses can readily be produced in a cost-effective manner. U.S. Pat. No. 8,317,505, which is incorporated herein by reference in its entirety, discloses a method for growing a Lens Precursor Form on a single male optical mandrel on a Voxel by Voxel basis by selectively projecting actinic radiation through the optic mandrel and into a vat or bath of a Reactive Mixture. The optical mandrel and Lens Precursor Form are then removed from the vat and inverted so that the convex surface of the optic mandrel is upright. Following a dwell period during which uncured residual liquid from the bath that remains on the Lens Precursor Form flows under gravity or otherwise over the Lens Precursor Form, the liquid is then cured by applying Fixing Radiation to form the final lens. As described therein, a truly custom lens can be produced for any given eye.

The '505 patent discloses in detail the use of light centered around 365 nm as the primary means of curing to form the precursor as described therein. 365 nm light is desirable for controlled growth of the reactive monomer mixture (RMM) from the optic surface since this wavelength will be partly attenuated by the Norbloc component present in a RMM such as Etafilcon as defined herein. This attenuation allows for the controlled growth of the precursor. Under the system and method taught by the '505 patent, the time needed to form the precursor is approximately 75 seconds. This time could be reduced by lowering the concentration of the Norbloc component in the RMM formulation, but this is not desirable as it is not desirable to change the UV blocking characteristics of the finished contact lens product.

If one were to use wavelengths lower than 365 nm (i.e., 340 nm) then polymerization would occur more slowly, resulting in precursor forming times that would be unacceptably long. For example, at 350 nm the forming time for the same RMM would increase to approximately 20 minutes.

If one were to use wavelengths higher than 365 nm (i.e., 420 nm), then polymerization would occur too rapidly, leading to lack of lens thickness control and/or unwanted oligomers on the precursor surface.

While 365 nm centered LED light has been found to be ideal for controlled polymer growth due to the level of light attenuation and polymerization kinetics of the RMM, the polymerization rate still proceeds quite slowly once the thickness of the desired precursor reaches approximately 350 microns. For reference, 350 microns is a common thickness in stabilization zones of an astigmatic lens. Thus, use solely of a 365 nm centered LED light has limitations such that certain desired lenses cannot be made efficiently enough to allow the system to be used in a commercial manner for making these lenses.

As such, it would be desirable to improve the system and method for making contact lenses described in the '505 patent so that it can be applied commercially to manufacture any desired contact lens, including contact lenses having increased thicknesses either in whole or in selected regions.

SUMMARY OF THE INVENTION

A method for forming a contact lens is provided including the steps of obtaining a Lens Reactive Mixture; submerging a convex optical quality surface of a forming optic in a reservoir containing the Lens Reactive Mixture; projecting a first Actinic Radiation having a first spectrum of wavelengths through pre-selected regions of the forming optic, wherein the pre-selected regions correspond to locations of the contact lens to be formed having a thickness greater than a pre-determined thickness, and wherein the first Actinic Radiation is selectively controlled to selectively polymerize or partially polymerize the Lens Reactive Mixture on a Voxel by Voxel basis at the pre-selected regions; projecting a second Actinic Radiation having a second different spectrum of wavelengths through the forming optic over a second region corresponding to an entirety of the contact lens to be formed, wherein the second Actinic Radiation is selectively controlled to selectively polymerize or partially polymerize the Lens Reactive Mixture on a Voxel by Voxel basis across the forming optic to form a Lens Precursor; removing the forming optic and formed Lens Precursor from the Lens Reactive Mixture; and applying a Fixing Radiation to form the contact lens.

The projection of the first Actinic Radiation may be ceased before transmitting the second Actinic Radiation, or alternatively may continue in conjunction with transmission of the second Actinic Radiation.

According to one embodiment, the first Actinic Radiation is centered around a 420 nm wavelength light and the second Actinic Radiation is centered around a 365 nm wavelength light. In yet another embodiment, the first Actinic Radiation is centered around a 385 nm wavelength light and the second Actinic Radiation is centered around a 365 nm wavelength light. The pre-determined thickness may be 350 microns.

According to yet another embodiment, the Lens Reactive Mixture includes an initiator and a UV blocker, and the second Actinic Radiation is partially attenuated by the UV blocker and is within an absorbance range of the initiator, and the first Actinic Radiation is not attenuated by the UV blocker and is not within the absorbance range of the initiator.

Also provided is an apparatus for forming a contact lens, including a male mold mandrel having a convex optical quality surface upon which the ophthalmic device may be formed by crosslinking a Reactive Mixture without shaping according to a cast mold, wherein at least a portion of the convex optical quality surface protrudes into a space within a container that holds the Reactive Mixture, wherein a volume of the container is greater than a volume of the contact lens to be formed therein, and wherein a shape of the container does not influence a shape of the contact lens to be formed therein. The apparatus further includes a first light source including a plurality of beams of a First Actinic radiation having a first spectrum of wavelengths, each directed through at least a pre-selected portion of the male mold mandrel and the convex optical quality surface, where each of the plurality of beams is selectively controllable to thereby selectively cure portions of the Reactive Mixture through the male mold and convex optical quality surface at the at least one pre-selected portion. The apparatus further includes a second light source including a plurality of beams of a second Actinic Radiation having a second spectrum of wavelengths that is different than the first spectrum of wavelengths, where each is directed through an area of the male mold mandrel and convex optical quality surface corresponding to an entirety of the contact lens to be formed, and where each of the plurality of beams is selectively controllable to thereby selectively cure portions of the Reactive Mixture through the male mold and convex optical quality surface across the area.

According to one embodiment, on and off state of the first and second Actinic radiation are separately controllable. The first and second Actinic Radiation may be simultaneously activated. In one embodiment the first Actinic Radiation is centered around a first wavelength and the second Actinic Radiation is centered around a second wavelength. In different embodiments, the first Actinic Radiation may be centered around a 420 nm wavelength light and the second Actinic Radiation centered around a 365 nm wavelength light, or the first Actinic Radiation may be centered around a 385 nm wavelength light and the second Actinic Radiation centered around a 365 nm wavelength light.

In yet another embodiment, the at least one pre-selected portion corresponds to a location at which a desired thickness of the contact lens is at least 350 microns.

In a further embodiment, the Lens Reactive Mixture includes an initiator and a UV blocker, and the second Actinic Radiation is partially attenuated by the UV blocker and is within an absorbance range of the initiator, and the first Actinic Radiation is not attenuated by the UV blocker and is within the absorbance range of said initiator.

BRIEF DESCRIPTION OF THE DRAWINGS

FIGS. 4a-4d are exemplary tables used to define projections profiles of a dual wavelength forming system according to the present disclosure.

DETAILED DESCRIPTION OF THE INVENTION

Glossary

Figure 1:
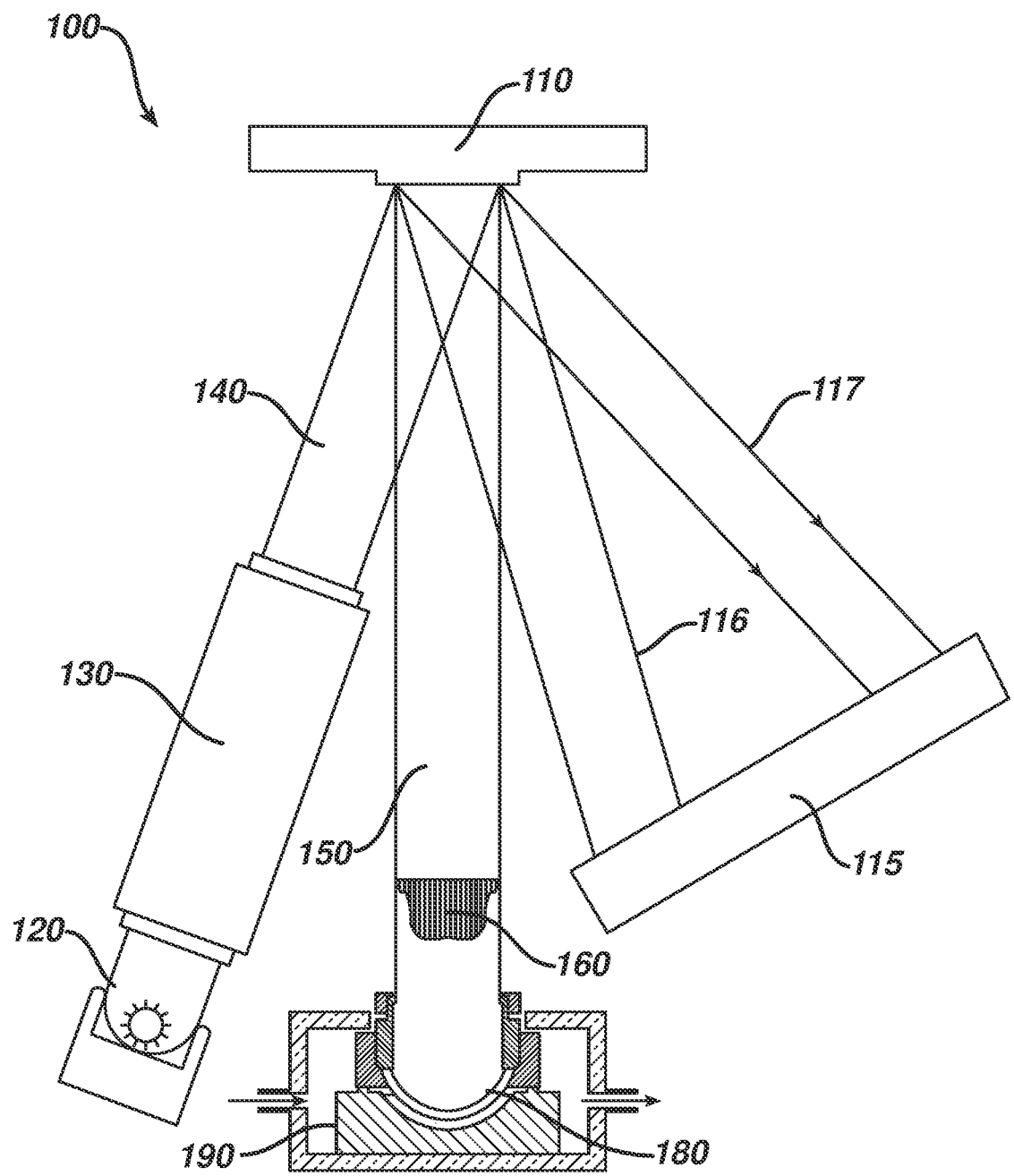
FIG. 1 illustrates a prior art apparatus useful in forming a contact lens according to the present disclosure.

In the description and claims directed to the present invention, various terms may be used for which the following definitions will apply:

"Actinic Radiation" as used herein, refers to radiation that is capable of initiating a chemical reaction.

"DMD" as used herein, a digital micromirror device, is a bi-stable spatial light modulator consisting of an array of movable micromirrors functionally mounted over a CMOS SRAM substrate allowing for individual mirror on/off control. Each mirror is independently controlled by loading data into the memory cell below the mirror to steer reflected light, spatially mapping a pixel of video data to a pixel of on a display. The data electrostatically controls the mirror's tilt angle in a binary fashion, where the mirror states are either +X degrees (on) or −X degrees (off). For current devices, X can be either 10 degrees or 12 degrees (nominal). Light reflected by the on mirrors is then passed through a projection lens and onto a screen. Light is reflected off to create a dark field and defines the black-level floor for the image. Projected images are created by gray-scale modulation between mirror on and off times at a rate fast enough to create different intensities at the formation surface and in turn create topological thickness changes. The DMD is sometimes called a DLP projection system.

"Etafilcon" as used herein refers to an exemplary material that may be used as a Reactive Mixture and can include approximately: ~95% HEMA (2-hydroxylethyl methacrylate) and 1.97% MMA (methacrylic acid) and 0.78%% EGDMA (ethyleneglycol dimethacrylate) and 0.10%/TMPTMA (trimethylolpropane trimethacrylate) cross-linker and ~1% photoinitiator CGI 1700 and Diluent—BAGE (boric acid ester of glycerol)(U.S. Pat. No. 4,495,313) in a 52:48 reactive component:diluent ratio.

"Fixing Radiation" as used herein, refers to Actinic Radiation sufficient to one or more of: polymerize and crosslink essentially all Reactive Mixture comprising a Lens Precursor or lens.

"Fluent Lens Reactive Media" as used herein, means a Reactive Mixture that is flowable in either its native form, reacted form, or partially reacted form and is formed upon further processing into a part of an ophthalmic lens.

"Free-form", "free-formed" or "free-form" as used herein refers to a surface that is formed by crosslinking of a Reactive Mixture and is not shaped according to a cast mold.

"Gel Point" as used herein shall refer to the point at which a gel or insoluble fraction is first observed. Gel point is the extent of conversion at which the liquid polymerization mixture becomes solid. Gel point can be determined using a Soxhlet experiment: polymer reaction is stopped at different time points and the resulting polymer is analyzed to determine the weight fraction of residential insoluble polymer. The data can be extrapolated to the point where no gel is present. This point where no gel is present is the gel point. The gel point may also be determined by analyzing the viscosity of the reaction mixture during the reaction. The viscosity can be measured using a parallel plate rheometer, with the reaction mixture between the plates. At least one plate should be transparent to radiation at the wavelength used for polymerization. The point at which the viscosity approaches infinity is the gel point. Gel point occurs at the same degree of conversion for a given polymer system and specified reaction conditions.

"Lens" as used herein refers to any ophthalmic device that resides in or on the eye. These devices can provide optical correction or may be cosmetic. For example, the term lens can refer to a contact lens, intraocular lens, overlay lens, ocular insert, optical insert or other similar device through which vision is corrected or modified, or through which eye physiology is cosmetically enhanced (e.g. iris color) without impeding vision. In some embodiments, the preferred lenses of the invention are soft contact lenses are made from silicone elastomers or hydrogels, which include but are not limited to silicone hydrogels, and fluorohydrogels.

"Lens Precursor" as used herein means a composite object consisting of a Lens Precursor Form and a Fluent Lens Reactive Mixture in contact with the Lens Precursor Form. For example, in some embodiments Fluent Lens Reactive Media is formed in the course of producing a Lens Precursor Form within a volume of Reactive Mixture. Separating the Lens Precursor Form and adhered Fluent Lens Reactive Media from the volume of Reactive Mixture used to produce the Lens Precursor Form can generate a Lens Precursor. Additionally, a Lens Precursor Form can be converted to a different entity by either the removal of significant amounts of Fluent Lens Reactive Media or the conversion of a significant amount of Fluent Lens Reactive Media into non-fluent incorporated material.

"Reactive Mixture" or "RMM" (reactive monomer mixture) as used herein refers to a monomer or prepolymer material which can be cured and cross-linked or cross-linked to form an ophthalmic lens. Various embodiments can include lens forming mixtures with one or more additives such as UV blockers, tints, photoinitiators, or catalysts, and other additives one might desire in an ophthalmic lens such as contact or intraocular lenses.

"Voxel" as used herein is a volume element, representing a value on a regular grid in three-dimensional space. A Voxel can be viewed as a three-dimensional pixel, however, wherein a pixel represents 2D image data a Voxel includes a third dimension. In addition, wherein Voxels are frequently used in the visualization and analysis of medical and scientific data, in the present invention, a Voxel is used to define the boundaries of an amount of actinic radiation reaching a particular volume of Reactive Mixture. By way of example, Voxels are considered in the present invention as existing in a single layer conformal to a 2D mold surface wherein the Actinic Radiation may be directed normal to the 2D surface and in a common axial dimension of each Voxel. As an example, specific volume of Reactive Mixture may be cross-linked or polymerized according to 768×768 Voxels.

"Voxel-based Lens Precursor" as used herein shall mean a Lens Precursor where the Lens Precursor Form has been formed by use of a Voxel-based forming technique.

As described in detail in U.S. Pat. No. 8,317,505, a truly custom lens can be formed using Voxel-based forming methods and techniques. The apparatus takes highly uniform intensity radiation and controls irradiation onto the surface of a forming optic 180 (see FIG. 1) at numerous discrete points across the forming optic surface. The forming optic 180 is positioned within a volume of a Reactive Mixture, and controlling irradiation onto the surface of the forming optic controls the depth of curing of the resin at each discrete point, essentially "growing" the desired shape against the optical quality convex surface of the forming optic.

More particularly with reference to FIG. 1, the forming apparatus 100 functionally begins with a source of Actinic Radiation such as a light source 120, where the light generated emerges as light in a defined band of wavelengths but with some spatial variation in intensity and direction. Element 130, a spatial intensity controller or collimator, condenses, diffuses, and in some embodiments, collimates light to create a beam of light 140 that is highly uniform in intensity. Further, in some embodiments, the beam 140 impinges on a DMD 110 which divides the beam into pixel elements of intensity each of which can be assigned a digital on or off value. In reality, the mirror at each pixel merely reflects light in one of two paths. The "ON" path, item 150, is the path that leads to photons proceeding toward a reactive chemical media. Conversely, in some embodiments an "OFF" state includes a light being reflected along a different path that will lie between depicted items 116 and 117. The "OFF" path directs photons to impinge upon a beam dump 115 which has been carefully crafted to absorb and entrap any photons directed towards it. Referring back to the "ON" path, light directed in this path actually includes the potentially many different pixel values that have been set to the "ON" value and are spatially directed along the appropriate individual path corresponding to their pixel location. A time averaged intensity of each of the pixel elements along their respective paths can be represented as a spatial intensity profile 160, across the spatial grid defined by the DMD mirror 110. Alternatively, with a constant intensity impinging each mirror, item 160 may represent a spatial time exposure profile.

Figure 2:
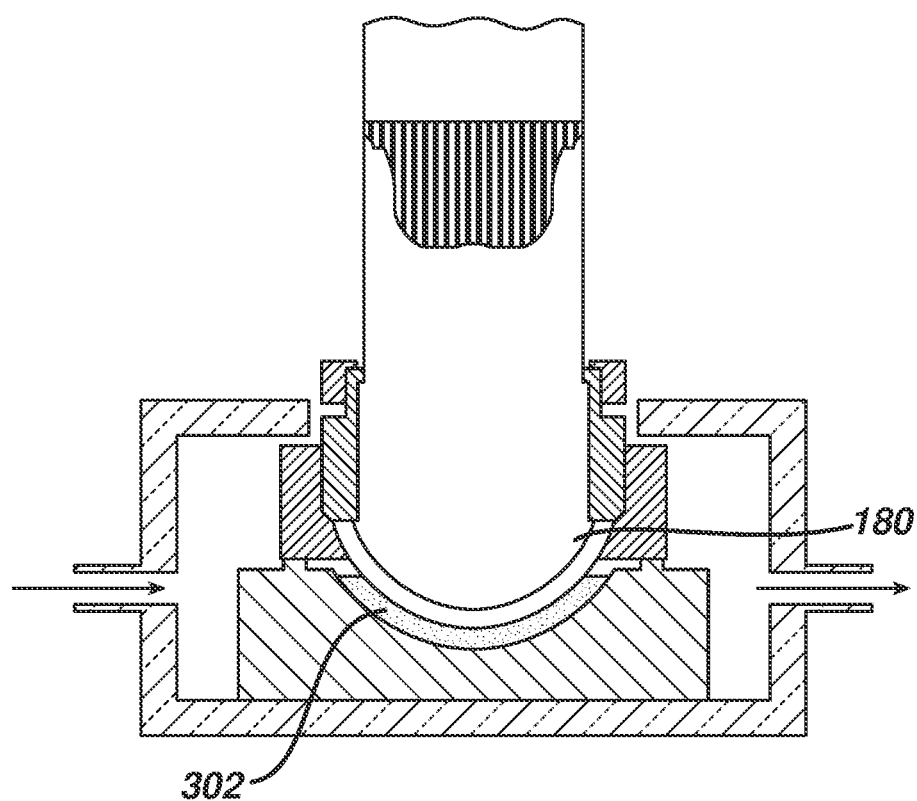
FIG. 2 is an enlarged view of the forming optic portion of the apparatus of FIG. 1.

Continuing, each pixel element in the "ON" state will have photons directed along their path 150. In some embodiments the beam may be focused by a focusing element. By way of example, in FIG. 1, the Voxel-based system 100 depicts an embodiment where the light paths 150 are imaged so that they impinge in an essentially vertical manner upon the surface of a forming optic 180. The imaged light now proceeds through the forming optic and into a volume of space that contains a Reactive Mixture in a reservoir 190, and around the forming optic 180. Photons in this volume may be absorbed and precipitate an actinic reaction in the molecule that absorbs it, leading to a polymerization state change of the monomer in the general vicinity. By selectively controlling the time and/or intensity of irradiation at each pixel, one can control the depth cure of the reactive lens mixture (302, see FIG. 2) in the reservoir 190, essentially providing complete control, on a Voxel by Voxel basis, of the shape that is produced adjacent the convex surface of the forming optic, forming a Lens Precursor Form.

It is in this general way that one particular embodiment of the Voxel based forming can be understood to function. Various additional details of various components of this embodiment, and alternatives thereto, are described in detail in the prior art, as for example in U.S. Pat. No. 8,317,505. Further, although a DMD device is described in detail therein, any suitable source of selectively controllable actinic radiation could be used.

As indicated previously, in order to shorten forming times one could either reduce the level of Norbloc (or other UV blocker) in the RMM formulation, which is undesirable as it changes the UV blocking characteristics of the finished lens product, or increase the wavelength of the LED light so that the light will drive deeper into the RMM to create a thicker depth of cure in the same time period. With a faster polymerization rate, however, the ability to precisely control thickness is reduced and the likelihood of creating unwanted oligomers in the fluent media on the precursor surface increases. The present invention provides a system and method that selectively employs different wavelengths of light in a manner that enables precise forming of any thickness lens in a commercially suitable time. The described system and method is particularly advantageous in forming stabilized lens designs, such as astigmatic lenses that often contain thicker stabilization zones, and for high powered lenses.

As a preliminary point those skilled in the art recognize that a "single wavelength" light from any source is theoretically impossible (although a laser light source may most closely approximate it). Thus, for the purposes of the present disclosure, to the extent light from an LED light source or the like is described as being of a specified or single wavelength, it is to be understood that what is meant is that although there is a spectrum of light, this spectrum is a "peak wavelength spectrum" around that identified wavelength, or is otherwise centered around the specified target or desired wavelength.

Figure 3:
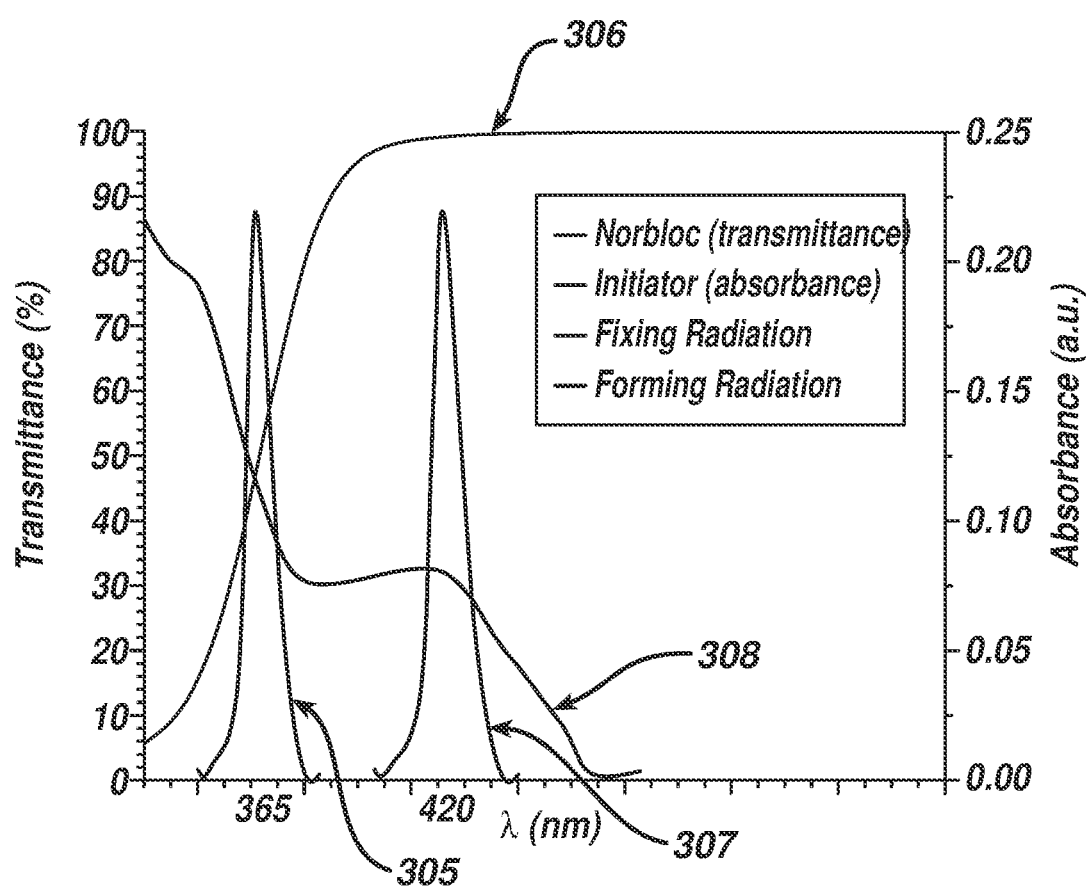
FIG. 3 is a graph illustrating the transmittance of selected wavelengths of light in relation to Norbloc transmittance and initiator absorbance.

These principals are illustrated in FIG. 3, which is a graph showing both 365 nm centered LED light and 420 nm centered LED light versus both the transmittance of Norbloc at various wavelengths and initiator absorbance at various wavelengths. As illustrated, at 365 nm light (305) the LED light is partially attenuated by the Norbloc component (306) in the RMM, which allows for controlled polymer growth. With 420 nm light (307), the light is not attenuated by the Norbloc component, but is still within the initiator absorbance range (308). As such polymerization will occur, but the ability to control growth is greatly reduced since attenuation cannot be controlled.

Once the thickness of a lens increases above approximately 350 microns, for a given intensity and RMM, attenuation by the Norbloc component of the RMM becomes a barrier to producing a contact lens by the free form method within a commercially reasonable time period. This is because attenuation becomes significant enough at 350 microns that the time required to cure to further depths increases greatly. For example, using 365 nm light requires approximately 2 minutes to cure to a depth of 350 nm. These depths are not uncommon, particularly in astigmatic lenses where stabilization zones are required to properly stabilize the lens on the eye. Stabilization zones function to weigh down the contact lens in a desired direction and/or interact with the eyelids in such a way as to thereby prevent it from rotating while sitting on the eye. Given the time required for cure at 365 nm as described above, it is not commercially viable to form lenses by the free form method when lens thickness exceeds approximately 350 microns.

The present disclosure provides a new system and method by which lenses of any thickness can be formed using free form methods, within commercially viable time periods.

Figure 5:
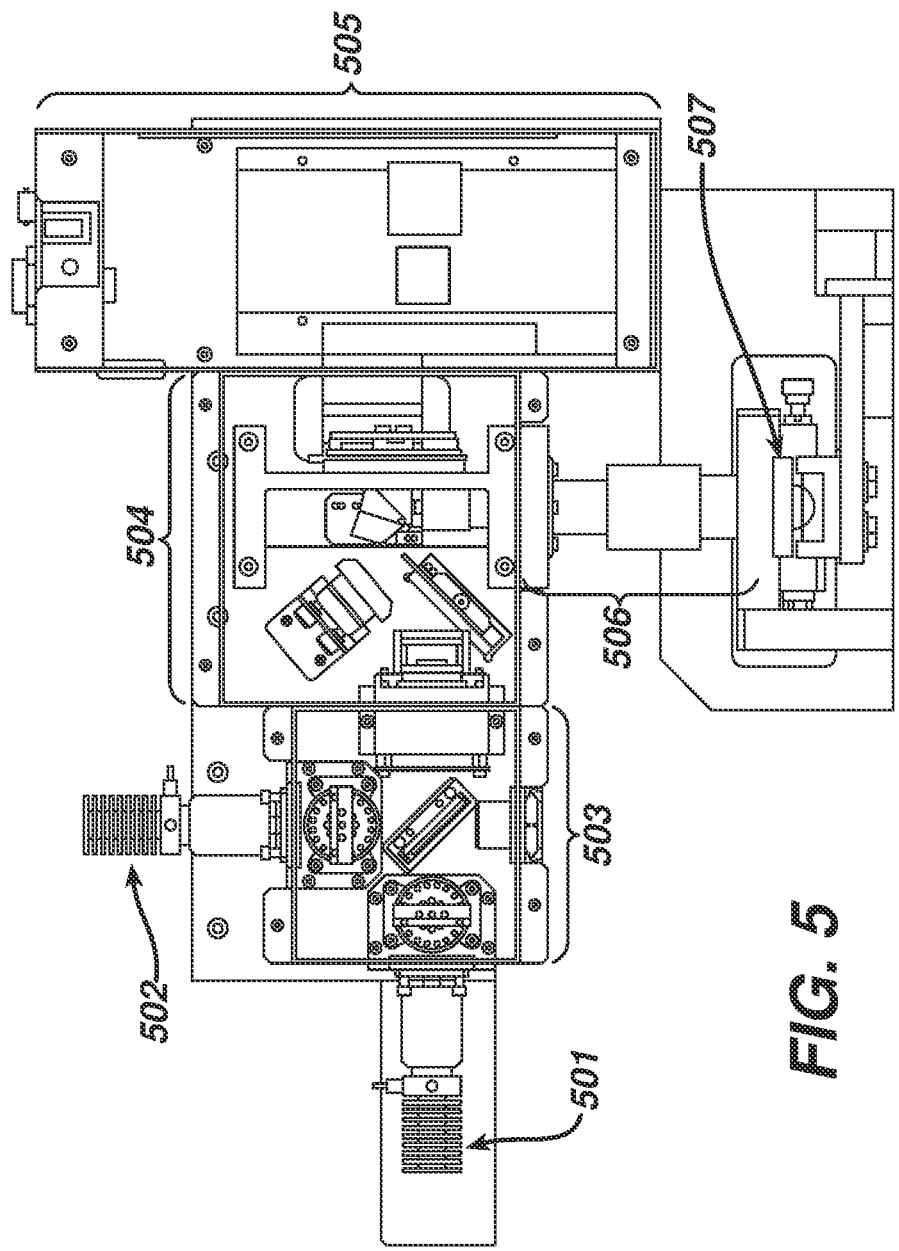
FIG. 5 is a side, cross-sectional view of a DLP based projection system having dual LED light sources that can be used in forming a contact lens according to the present disclosure.

According to one embodiment, this is accomplished by selectively activating two different LED wavelengths for curing to form the single lens precursor. In a preferred embodiment, both 365 nm centered LED light and a 385 nm or 420 nm centered LED light are simultaneously activated. An exemplary device incorporating dual LEDs is shown in FIG. 5. The system includes a first LED light 501 centered around a first wavelength and a second LED light 502 centered around a second wavelength. Both light sources are directed into trim filters and a beam combiner in element 503. The combined beam then enters the DMD device 504, where it is homogenized and imaged onto a DMD using fly's-eye optics, mirrors and a prism as will be readily understood by those skilled in the art. The DMD is controlled by electronic hardware and firmware in DMD control device 505. The beam then passes through various projection optics within projection path 506 and is focused to impinge on the forming optic 507 in the desired manner as will be described further below.

In one embodiment, 365 nm LED is directed exclusively at the optic zone to ensure that at the most important locations of the lens for visual correction, the depth of cure can be precisely controlled and undesirable oligomers or excessive viscosity of the fluent media at the surface of the lens precursor can be avoided entirely. If desired, 365 nm light may also be used exclusively at the edges, and transitions between the stabilization zones and the lens peripheral. In stabilization zone portions or other portions where a thickness greater than 350 microns is desired, a 385 nm or 420 nm LED light is directed at those selected portions initially, but for a small portion of the total forming time in those areas. For example, the higher wavelength light can be used for 5-10% of the total forming time, then immediately shut off so that only the 365 nm light is used for the remainder of the forming time. The higher wavelength is initially directed to only the selected thicker regions by specific instructions to control the on/off state of the DMD mirrors that illuminate those regions of the desired lens.

A DLP based projection system can be used such at that described in U.S. Pat. No. 8,317,505 in a 1% low oxygen glove box environment and Etafilcon or a variant thereof. Dual LED lights, one centered around 365 nm and one centered around 420 nm are installed in the projection system. The projection software for the DLP polls specific database tables to determine what regions and/or layers of the lens are to be irradiated over the course of the forming times to form the desired lens precursor. For single LED wavelength applications such as that described in the prior art '505 patent, the single 365 nm LED will be used exclusively. For dual LED systems, the referenced software tables will define specific projection profiles for both LED wavelength to reduce the overall forming times as described above. The projection system utilizes light from both installed LEDs by controlling the LED lamps as well as mirrors on the DLP (digital light processor) chip. The projection software polls specific data based tables to determine what regions and/or layers of the lens to produce over the course of the lens forming time. These tables help to define the specific projection profiles that have the possibility of reducing overall forming time by using high wavelength (420 nm) light to form thick regions, and lower wavelength (365 nm) light to form the remaining portions as well as the optic zone.

For example, the table in FIG. 4a illustrates the use of two regions and two sublayers as part of the projection profile of "MultisprectralLensProfile Test 3" comprised of Region ID's 6 and 7 and Sublayer ID's 21 and 24. As further shown in the table of FIG. 4b, the Region ID's 6 and 7 are further defined, with Region ID 6 being defined as a region of the lens that has a target thickness of greater than 460 microns, and Region ID 7 being defined as any target lens thickness less than 2000 microns, which by definition is the entire lens. The rationale for this divisions is so that the longer wavelength (420 nm light in this example) can be applied to a specific lens region and the shorter wavelength (365 nm in this example) can be applied to the entire lens.

Region ID 6 is further divided into Sublayer ID's 21 and 24, which are further defined in the table of FIG. 4c. This subdivision allows sublayer 21 to take projection priority over sublayer 5 24 (as indicated in the table of FIG. 4b), as sublayer 21 has a projection parameter that includes the longer wavelength light for its increased thickness. Thus, in this example, the fixed value projection of 10 microns translates into a projection time based on the growth factor coefficient defined in the table of FIG. 4d for Projection Parameter ID "Multispectral-LongLED Test 3". The table of FIG. 4d also defines the LED intensity setting for each wavelength LED as this will 10 impact how much actual lens thickness will be achieved independent of other projection settings.

Finally, both lens regions ID's 6 and 7 are completed using sublayer 24 which designates a projection parameter ID called "Multispectral-ShortLED Test 3" that calls for the short wavelength LED lamp (365 nm peak) to complete the projection of the lens. The total time of this projection event is determined by the growth factor coefficients in the table of FIG. 4d since 15 the specific machine interaction parameters set "Off-line VLEC nominal multispectral" does not call for a fixed projection time. This allows the projection time to be calculated as short as possible (about 20 seconds in this case) by these database definitions, rather than being set to a fixed value. For the fixed time is longer than the time necessary to produce the desired thickness, making the production process more automation friendly.

In short, the software polls the database tables which instruct that, for sublayer 21, the higher wavelength light will be enabled first for the specified regions and for the specified times, and subsequently the shorter wavelength light will be enabled across the entire lens for the remainder of the specified time.

Although the embodiment described above involves 365 and 420 nm LED lights turned on simultaneously for an initial portion of the curing time, and the 420 nm LED subsequently turned off for the remainder of the cure time, those skilled in the art will readily understand that various alternatives using dual wavelength LED light can be implemented. For example, the 420 nm LED light may be turned on initially in specified locations, then the 365 nm light used to illuminate the full lens for the remainder of the time (either alone or in conjunction with the 420 nm LED). Further, various wavelengths of light can be implemented and optimized according to various specific properties of the selected reactive monomer mixture. For example, for the same RMM, 385 nm light could readily be used in place of 420 nm light for the higher wavelength LED.

Further, in addition to selecting two different wavelengths, one could use a single wavelength (i.e., 365 nm) and selectively boost the intensity of the light for a selected period of time in lens regions thicker than 350 microns in order to speed the formation of those regions. Preferably, this increased intensity would not be used in the lens optic zone to avoid polymerization occurring too rapidly. In the alternative one could use a single LED light source centered around the higher wavelength (i.e., 385 nm or 420 nm) in conjunction with a dichroic filter, more specifically a short pass filter. By placing this type of filter on a motorized stage in the LED light path, light having longer wavelengths would be allowed to pass for a short period of time to form thick regions and then movement of the filter with the motorized stage would allow only the shorter wavelengths to be transmitted throughout the remainder of the forming time. This in principle may accomplish a desired result, but will require rapid movement to achieve and may not offer as wide a selection of long versus short wavelength peaks as one could achieve with two or more LED sources. Additionally, use of only one LED source does not allow for independent intensity control of the light source, therefore additional LED driver logic would be needed to address any intensity deficiencies derived from activation of the dichroic filter angle and transmission properties.

Although the disclosure herein has been primarily directed at using two different LED lights with two different peak wavelength spectrums, various other techniques and devices well known to those skilled in the art may be employed to achieve selective and differential curing of lenses as described in the present invention.

For example, one alternative is to use a single broadband light source, rather than one or more single peak wavelength spectrum LED light sources, in conjunction with a synchronized filter wheel to sequentially project two or more different peak wavelength spectrums of light to the DMD. The DMD is synchronized with the filter wheel to move in rapid succession between the different projection patterns as desired. In the alternative, in a manner analogous to the way next generation DMD digital light projectors have replaced a color filter wheel with red, green and blue LED light sources, the filter wheel could be replaced with two or more individual LEDs of different peak wavelength spectrums, cycling between activation of the different LEDs and synchronized with the DMD device. In yet another embodiment, a single peak wavelength spectrum LED light source could be used along with a trim filter that can be adjusted as between various angled positions to alternate between projecting at least first and second peak wavelength spectrums of light through the forming optic and into the reactive monomer mixture.

Finally, the principals of hyperspectral illumination and projection, which are known to those skilled in the art, could be employed to allow for the creation of nearly infinite spectrums of light that can be selectively applied into a lens precursor DMD show. With hyperspectral illumination, the light source includes an entire spectrum of light, with different wavelengths separated out by a prism or "grating" component such that the different wavelengths are projected onto a first DMD at specific columns (one or more) of the DMD mirror array. This selected spectrum of light is then projected or imaged onto a second DMD the mirrors of which are selectively controlled to transmit or project the desired pattern onto the forming optic and into the reactive monomer mixture. This embodiment provides a nearly infinite ability to create a spectrum of light (not just a single peak wavelength spectrum) that is used to enable selective curing, and thus provides a much higher degree of "tuning" or selectivity. Further, it enables real-time transitioning from one spectrum to another via the first DMD device, while simultaneous imaging is occurring via the second DMD device.

Although illustrative embodiments of methods of manufacturing the described lenses and exemplary devices to implement those methods have been described herein with reference to the accompanying drawings, it is to be understood that the invention is not limited to those precise embodiments and that various other changes and modifications may be effected herein by one skilled in the art without departing from the scope or spirit of the invention, which is limited only by the claims herein.

What is claimed is:

1. A method for forming a contact lens having an optic zone comprising:
    forming a Lens Precursor by
        obtaining a Lens Reactive Mixture including a UV blocker and a photoinitiator;
        submerging a convex optical quality surface of a forming optic in a reservoir containing said Lens Reactive Mixture;
        projecting a first Actinic Radiation having a first spectrum of wavelengths through pre-selected regions of said forming optic, wherein the first spectrum of wavelengths is not attenuated by said UV blocker and is within an initiator absorbance range of said photoinitiator; wherein said pre-selected regions correspond to locations of said contact lens to be formed having a thickness greater than a pre-determined thickness and that are not located in the optic zone, and wherein said first Actinic Radiation is selectively controlled to selectively polymerize or partially polymerize said Lens Reactive Mixture on a Voxel by Voxel basis at said pre-selected regions; and
        projecting a second Actinic Radiation having a second different spectrum of wavelengths through said forming optic over a second region corresponding to an entirety of said contact lens to be formed, wherein said second spectrum of wavelengths is at least partially attenuated by said UV blocker and is within said initiator absorbance range of said photoinitiator, wherein said second Actinic Radiation is selectively controlled to selectively polymerize or partially polymerize said Lens Reactive Mixture on a Voxel by Voxel basis across said forming optic;

wherein a time required to form said Lens Precursor is less than a time required to form said Lens Precursor using only said second Actinic Radiation;

removing said forming optic and formed Lens Precursor from said Lens Reactive Mixture;

applying a Fixing Radiation to form said contact lens.

2. The method according to claim 1, wherein said projection of said first Actinic Radiation is ceased before transmitting said second Actinic Radiation.

3. The method according to claim 1, wherein said projection of said first Actinic Radiation continues in conjunction with transmission of said second Actinic Radiation.

4. The method according to claim 1, wherein said first Actinic Radiation is centered around a 420 nm wavelength light and said second Actinic Radiation is centered around a 365 nm wavelength light.

5. The method according to claim 1, wherein said first Actinic Radiation is centered around a 385 nm wavelength light and said second Actinic Radiation is centered around a 365 nm wavelength light.

6. The method according to claim 1, wherein said predetermined thickness is 350 microns.

* * * * *